United States Patent
Valentin et al.

(10) Patent No.: US 10,717,152 B2
(45) Date of Patent: Jul. 21, 2020

(54) SYSTEM FOR LASER MATERIAL PROCESSING AND METHOD FOR ADJUSTING THE SIZE AND POSITION OF A LASER FOCUS

(71) Applicant: Scanlab GmbH, Puchheim (DE)

(72) Inventors: Martin Valentin, Puchheim (DE); Martin Becker, Puchheim (DE); Sebastian Thunich, Puchheim (DE)

(73) Assignee: SCANLAB GmbH, Puchheim (DE)

(*) Notice: Subject to any disclaimer, the term of this patent is extended or adjusted under 35 U.S.C. 154(b) by 372 days.

(21) Appl. No.: 15/576,408

(22) PCT Filed: May 17, 2016

(86) PCT No.: PCT/EP2016/061036
§ 371 (c)(1),
(2) Date: Nov. 22, 2017

(87) PCT Pub. No.: WO2016/188803
PCT Pub. Date: Dec. 1, 2016

(65) Prior Publication Data
US 2018/0154481 A1 Jun. 7, 2018

(30) Foreign Application Priority Data
May 26, 2015 (DE) .......... 10 2015 108 248

(51) Int. Cl.
*B23K 26/046* (2014.01)
*G02B 27/09* (2006.01)
(Continued)

(52) U.S. Cl.
CPC ........ *B23K 26/046* (2013.01); *B23K 26/0648* (2013.01); *G02B 17/008* (2013.01);
(Continued)

(58) Field of Classification Search
CPC ............ B23K 26/0604; B23K 26/0643; B23K 26/0648; B23K 26/073
(Continued)

(56) References Cited

U.S. PATENT DOCUMENTS 5,136,136 A * 8/1992 Karube .................. B23K 26/06 219/121.73
6,317,276 B1 11/2001 Braat
(Continued)

FOREIGN PATENT DOCUMENTS

| CN | 101290398 | 10/2008 |
| CN | 102759799 | 10/2012 |

(Continued)

OTHER PUBLICATIONS

Espacenet, English abstract of DE19825092 A1, printed Apr. 20, 2018.
(Continued)

*Primary Examiner* — David P Angwin
*Assistant Examiner* — Nicholas A Ros
(74) *Attorney, Agent, or Firm* — Cahn & Samuels, LLP

(57) ABSTRACT

The invention relates to a laser material processing system comprising a collimation optic (K) having a total collimation focal length (fK), consisting of: a beam supply (Z) for divergent beams (D); a first and second optical device (L1, L2) having a positive or negative focal length (f1, f2), wherein the divergent beams (D) first pass through the first optical device (L1) and subsequently pass through the second optical device (L2), and leave the second optical device (L2) in a collimated state; a third optical device (0) arranged downstream of the collimation optic (K) and having a positive focal length (fO) that focuses the beams (P) leaving the collimation optic (K) in a collimated state to a focus (F); a first and second adjusting element (A1, A2) for indepen-
(Continued)

dently moving the first or the second optical device (LI, L2) away from one another along a beam propagation direction (R), wherein a total beam path (gs) between the beam supply (Z) and an image-side focal plane (B) of the third optical device (0) is smaller that twice the sum of the positive focal length (fO) of the third optical device (0) and the total collimation focal length (fK).

27 Claims, 3 Drawing Sheets

(51) Int. Cl.
G02B 19/00 (2006.01)
B23K 26/06 (2014.01)
G02B 17/00 (2006.01)
G02B 26/10 (2006.01)
G02B 27/30 (2006.01)
G02B 27/14 (2006.01)

(52) U.S. Cl.
CPC ....... *G02B 19/0014* (2013.01); *G02B 26/105* (2013.01); *G02B 27/0955* (2013.01); *G02B 27/30* (2013.01); *G02B 27/14* (2013.01)

(58) Field of Classification Search
USPC .................................. 219/121.75–121.79
See application file for complete search history.

(56) References Cited

U.S. PATENT DOCUMENTS

| | | | |
|---|---|---|---|
| 7,474,448 B2 | 1/2009 | Bruestle et al. | |
| 8,742,288 B2 * | 6/2014 | Kwok | B23K 26/0738 219/121.75 |
| 8,796,582 B2 | 8/2014 | Kawai et al. | |
| 10,413,996 B2 * | 9/2019 | Ito | B23K 26/0006 |
| 2006/0245084 A1 | 11/2006 | Brustle et al. | |
| 2007/0193984 A1 | 8/2007 | Kawai et al. | |
| 2013/0044371 A1 | 2/2013 | Rupp et al. | |
| 2014/0307312 A1 | 10/2014 | Rupp et al. | |

FOREIGN PATENT DOCUMENTS

| | | |
|---|---|---|
| CN | 203275775 | 11/2013 |
| DE | 198 25 092 A1 | 12/1999 |
| DE | 10 2005 033 605 A1 | 1/2007 |
| DE | 10 2008 048 502 A1 | 4/2010 |
| DE | 10 2009 046 485 A1 | 5/2011 |
| DE | 10 2011 117 607 A1 | 5/2013 |
| DE | 10 2012 108 214 B4 | 4/2014 |
| EP | 1643284 A1 | 4/2006 |
| FR | 2 977 513 A1 | 1/2013 |
| GB | 2518664 A | 4/2015 |
| JP | H04327394 A | 11/1992 |
| JP | 2006218487 A | 8/2006 |

OTHER PUBLICATIONS

European Patent Office, Patent Translate, English abstract of DE102005033605 A1, printed Apr. 20, 2018.
Espacenet, English abstract of DE102008048502A1, printed Apr. 20, 2018.
Espacenet, English abstract of DE102011117607 A1, printed Apr. 20, 2018.
Deutsches Patent-und Markenamt, Office Action in German Application No. 10 2015 108 248.9, dated Jan. 2, 2016.
European Patent Office, International Search Report in PCT Application No. PCT/EP2016/061036, dated Aug. 19, 2016.
European Patent Office, English abstract of JPH04327394A1, printed Dec. 7, 2018.
European Patent Office, English abstract of EP1643284A1, printed Nov. 27, 2018.
European Patent Office, English abstract of JP2006218487A, printed on Dec. 7, 2018.
European Patent Office, English abstract of CN101290398A, printed Dec. 7, 2018.
European Patent Office, English abstract of DE102008048502A1, printed Dec. 7, 2018.
European Patent Office, English abstract of CN102759799A, printed on Dec. 7, 2018.
European Patent Office, English abstract of FR2977513A1, printed Dec. 7, 2018.
European Patent Office, English abstract of DE102011117607A1, printed Dec. 7, 2018.
European Patent Office, English abstract of CN203275775U, printed Dec. 7, 2018.
European Patent Office, English abstract of DE102012108214A1, printed Dec. 7, 2018.
State Intellectual Property Office of People's Republic of China, Office Action in CN2018102301693770, dated Oct. 26, 2018.
Japanese Patent Office, Office Action in JP2017-561378, dated Oct. 30, 2018.
European Patent Office, English abstract of DE102009046485A1, printed Dec. 7, 2018.

* cited by examiner

SYSTEM FOR LASER MATERIAL PROCESSING AND METHOD FOR ADJUSTING THE SIZE AND POSITION OF A LASER FOCUS

This application is the National Stage of International Application No. PCT/EP2016/061036, filed on May 17, 2016, which claimed the benefit of German Application No. DE 10 2015 108 248.9 filed May 26, 2015, which are hereby both incorporated by reference.

The invention relates to a system for laser material processing and a method for adjusting a size and a position of a focus along a beam propagation direction of a laser beam for laser material processing.

BACKGROUND OF THE INVENTION

Lasers are used on a large scale for material processing, for example for welding and cutting. For this purpose, the laser beam has to be passed over the workpiece. This may occur by moving a processing head relative to the workpiece. In this respect, the movement speed and hence also the processing speed are limited by the mass of the processing head or the mass of the workpiece. A higher processing speed may be achieved using processing heads having movable optical deflection units, for example rotatable mirrors, by means of which the laser beam is passed over the workpiece. Systems of this type are referred to as scanning systems.

A scanning system of this type may also be guided by a robot which then carries out a rough positioning. The scanning system which is clearly more dynamic than the robot carries out the fast and precise fine positioning of the focus.

Scanning systems of this type require that the position and the size of the focus should be completely under control during the processing. In this respect, it may, for example, be desirable to have a constant size of the focus, for example provided by its diameter, over the entire working area of the scanning system, independent of the driven focus position. Moreover, it may, for example, be desirable to be able to change the focus size specifically, depending on the processing requirements.

In addition, there is a requirement in scanning systems of this type to have outer dimensions which are as compact as possible. For example, it may be desirable to immerse in a workpiece with a complex shape using the robot-controlled scanning system, in order to carry out a laser processing therein in an inaccessible place. This is much easier the more compact the structure of the scanning system is.

SUMMARY OF THE INVENTION

It is an object of the invention to provide a unit having a compact structural form, which enables an independent adjustment of focus position and focus size in a highly dynamic way.

The invention provides a system for laser material processing, comprising: a collimation optic having a total collimation focal length, consisting of a beam supply for divergent beams, a first optical device having a positive focal length and a second optical device having a negative focal length, wherein the divergent beams first pass through the first optical device and subsequently pass through the second optical device, and leave the second optical device in a collimated state, a third optical device having a positive focal length, wherein the third optical device is arranged downstream of the collimation optic and focuses the beams leaving the collimation optic in a collimated state to a focus, and a second adjusting element for moving the second optical device along a beam propagation direction, wherein a mean beam path between an image-side principal plane of the second optical device and an object-side principal plane of the third optical device is chosen such that a size of the focus is substantially constant when moving the second optical device by means of the second adjusting element, by the second optical device and the third optical device being arranged in a way to form a telescope-like optical arrangement, and wherein a total beam path between the beam supply and an image-side focal plane of the third optical device is smaller than twice the sum of the positive focal length of the third optical device and the total collimation focal length.

According to an embodiment, the mean beam path between the image-side principal plane of the second optical device and the object-side principal plane of the third optical device fulfils the condition $f2+0.75*f0<d2<f2+1.25*f0$ or is approximately equal to the sum of the negative focal length of the second optical device and the positive focal length of the third optical device.

According to a further embodiment, the first optical device is immobile in the beam propagation direction.

According to a further embodiment, the system further comprises: a beam deflecting unit for deflecting the beams from the beam propagation direction to another direction, and a controller for controlling the second adjusting element and the beam deflecting unit, so that a position of the focus with respect to a surface of a material to be processed can be adjusted to predetermined values.

According to a further embodiment, the system further comprises a fourth optical device having a positive focal length which corresponds approximately to the positive focal length of the first optical device, and a fifth optical device having a negative focal length which corresponds approximately to the negative focal length of the second optical device, wherein the first optical device and the second optical device are configured to be passed-through by a processing beam, the fourth optical device and the fifth optical device are configured to be passed-through by an observation beam, the fourth optical device is coupled to the first optical device, and a movement of the fifth optical device is coupled to a movement of the second optical device.

The invention further provides a system for laser material processing, comprising: a collimation optic having a total collimation focal length, consisting of a beam supply for divergent beams, a first optical device having a positive focal length and a second optical device having a negative focal length, wherein the divergent beams first pass through the first optical device and subsequently pass through the second optical device, and leave the second optical device in a collimated state, a third optical device having a positive focal length, wherein the third optical device is arranged downstream of the collimation optic and focuses the beams leaving the collimation optic in a collimated state to a focus, a first adjusting element for moving the first optical device along a beam propagation direction, and a second adjusting element for moving the second optical device along the beam propagation direction, wherein the first adjusting element and the second adjusting element are able to move the first optical device and the second optical device independent of each other, wherein a total beam path between the beam supply and an image-side focal plane of the third optical device is smaller than twice the sum of the positive focal length of the third optical device and the total collimation focal length.

According to a further embodiment, a mean beam path is chosen between an image-side principal plane of the second optical device and the object-side principal plane of the third optical device in such a way that a size of the focus is substantially constant when moving the second optical device by means of the second adjusting element, by the second optical device and the third optical device being arranged in a way to form a telescope-like optical arrangement.

According to a further embodiment, the system further comprises: a controller configured to control the first adjusting element and the second adjusting element in such a way that a size of the focus and a position of the focus can be adjusted along the beam propagation direction to predetermined values, selectable independent of each other, by the movement of the first optical device and the second optical device, wherein the size of the focus is substantially adjusted by moving the first optical device, the position of the focus is adjusted along the beam propagation direction substantially by moving the second optical device, and wherein at least one of a change in the position of the focus along the beam propagation direction due to the movement of the first optical device and a change in the size of the focus due to the movement of the second optical device is considered, in order to adjust the predetermined values.

According to a further embodiment, at least one of the change in the position and the change in the size of the focus is considered by storing reference control data based on a calculation or measurement of position and size of the focus depending on the positions of the first optical device and the second optical device along the beam propagation direction, and determining necessary positions of the first optical device and the second optical device along the beam propagation direction by means of the stored reference control data, in order to adjust the predetermined values for the position and the size of the focus.

According to a further embodiment, the system further comprises: a beam deflecting unit for deflecting the beams from the beam propagation direction to another direction, wherein the controller is configured to control the first adjusting element, the second adjusting element and the beam deflecting unit, so that the size of the focus and a position of the focus with respect to a surface of a material to be processed can be adjusted to predetermined values.

According to a further embodiment, the system further comprises: a fourth optical device having a positive focal length which corresponds approximately to the positive focal length of the first optical device, a fifth optical device having a negative focal length which corresponds approximately to the negative focal length of the second optical device, wherein the first optical device and the second optical device are configured to be passed-through by a processing beam, the fourth optical device and the fifth optical device are configured to be passed-through by an observation beam, a movement of the fourth optical device is coupled to a movement of the first optical device, and a movement of the fifth optical device is coupled to a movement of the second optical device.

According to a further embodiment, the beam supply is coupled to an end of an optical fiber from which laser radiation emerges divergently.

According to an embodiment, a ratio of the positive focal length of the first optical device to a distance between the beam supply and an object-side principal plane of the first optical device is between 0.25 and 0.75.

According to a further embodiment, the first optical device is arranged in a way that an angle of incident beams is equal to an angle of emergent beams.

According to an embodiment, a sinus of a half-angle divergence of the divergent beams is in the range of 0.05 to 0.15, the positive focal length of the first optical device is in the range of 55 mm to 120 mm, the negative focal length of the second optical device is in the range of −75 mm to −160 mm, the total collimation focal length is in the range of 60 mm to 300 mm, a diameter of the beams after passing through the collimation optic is in the range of 14 mm to 50 mm, and the positive focal length of the third optical group is in the range of 300 mm to 800 mm.

According to an embodiment, the third optical device has a constant distance with respect to the beam supply.

According to a further embodiment, the first adjusting element, if existent, and the second adjusting element are linear drives, especially direct drives.

According to a further embodiment, the beam deflecting unit is arranged downstream of the third optical device in the beam propagation direction or the beam deflecting unit is arranged in the beam propagation direction between the second optical device and the third optical device.

The invention further provides a method for adjusting a size and a position of a focus along a beam propagation direction of a laser beam for laser material processing, comprising: generating substantially collimated beams having a total collimation focal length by providing divergent beams, supplying the divergent beams to a first optical device having a positive focal length, supplying beams which have passed through the first optical device having a positive focal length to a second optical device having a negative focal length, wherein the divergent beams, the first optical device and the second optical device are configured and arranged in a way that the beams having passed through the second optical device are substantially in a collimated state, generating the focus by supplying the substantially collimated beams to a third optical device, wherein a total beam path between a beam supply of the divergent beams and an image-side focal plane of the third optical device is smaller than twice the sum of the positive focal length of the third optical device and the total collimation focal length, moving the first optical device and the second optical device in a way that the size of the focus and the position of the focus along the beam propagation direction can be adjusted to predetermined values, selectable independent of each other, wherein the size of the focus is adjusted substantially by moving the first optical device along the beam propagation direction, the position of the focus along the beam propagation direction is adjusted substantially by moving the second optical device along the beam propagation direction, and considering at least one of a change in the position of the focus along the beam propagation direction due to the movement of the first optical device and a change in the size of the focus due to the movement of the second optical device, in order to adjust the predetermined values.

According to a further embodiment of the invention, the method further comprises deflecting the beams from the beam propagation direction to a direction other than the beam propagation direction, wherein the movement of the first optical device, the movement of the second optical device and the deflection of the beams are carried out in a coordinated way and simultaneously, in order to adjust the size of the focus and the position of the focus with respect to a surface of a material to be processed to predetermined values.

According to an embodiment of the invention, the third optical device and a supply for the divergent beams are arranged at a fixed distance relative to each other.

Exemplary embodiments of the invention are illustrated in the Figures and will hereinafter be explained in more detail.

DETAILED DESCRIPTION OF THE DRAWINGS

In the following detailed description, reference is made to the enclosed Figures which are incorporated therein and in which specific embodiments are shown by way of illustration, according to which the invention can be performed. In this respect, the terms "up", "down", "front", "rear", etc. are used with reference to the orientation in the described Figure(s). As components of embodiments may be positioned in a number of different orientations, the terminology indicating the different directions serves for illustration and shall not be restrictive in any way. It shall be understood that other embodiments may be used and structural or logical changes may be made without deviating from the scope of protection of the present invention. It goes without saying that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar members are provided with identical reference numbers where appropriate. For the sake of clarity, not all elements in the Figures can be provided with their own reference number. This applies in particular to elements which are illustrated to be identical to other elements. Thus, the description and reference signs may apply similarly to all elements illustrated graphically in the same way. The character (or characters) of a reference sign which is (are) in the first position when seen from the left-hand side, may indicate the Figure in which the reference sign appears for the first time.

Figure 1:
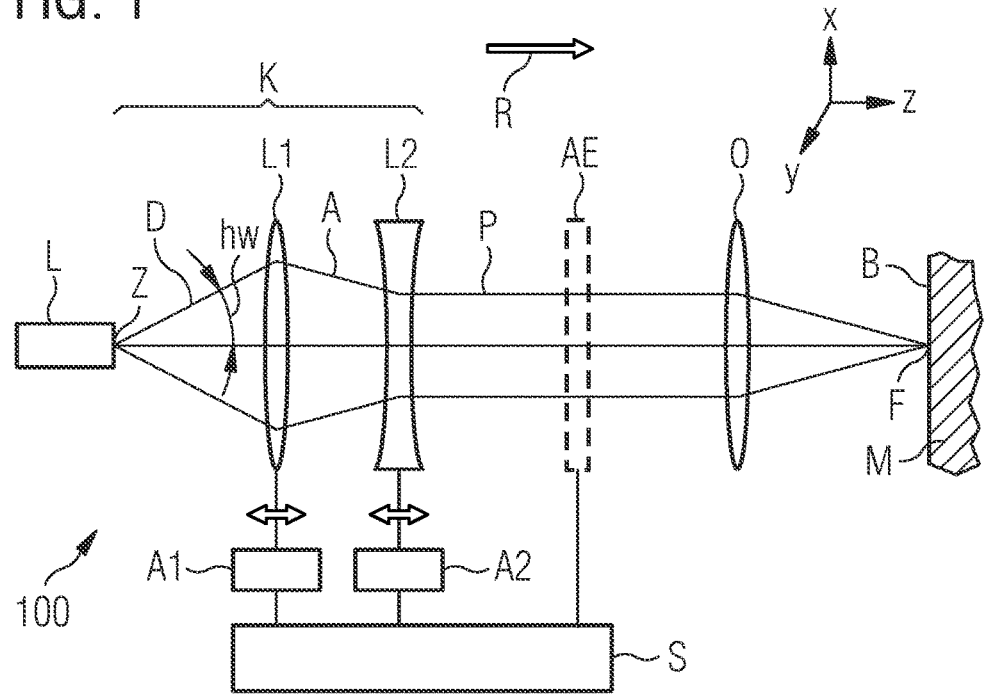
FIG. 1 shows an exemplary embodiment of a laser material processing system.

FIG. 1 shows an exemplary embodiment of a system 100 for laser material processing, by means of which a material (or a workpiece) M may be processed using laser beams originating from a laser source L. In this respect, the laser beams propagate from the laser source L in a beam propagation direction R to the focus F. The position of the focus F with respect to the material M and the size (or diameter) of the focus F may be adjusted.

The beam supply Z is configured in a way that laser radiation can emerge therefrom in a divergent way having a half-divergence angle hw. A laser source L providing the divergent laser radiation may be coupled to the beam supply Z. The laser source L may, for example, be the end of an optical fiber which may, for example, be coupled to a disk laser or a fiber laser.

The system 100 may comprise a collimation optic K which may form the beams D emerging in a divergent way from the laser source L into collimated beams P. Collimated beams P are substantially parallel beam bundles, the term "substantially parallel" being explained in more detail in connection with FIG. 2 and FIG. 3.

The collimation optic K may consist of the beam supply Z for divergent beams D, a first optical device L1 having a positive focal length f1 and a second optical device L2 having a negative focal length f2. In this respect, the divergent beams D first pass through the first optical device L1 as incident beams and subsequently pass through the second optical device L2 as emergent beams A. The first optical device L1 may be arranged in such a way that the angle of incident beams D equals the angle of emergent beams A. The ratio of the positive focal length f1 of the first optical device L1 to a distance d1 between the beam supply Z and an object-side principal plane of the first optical device L1 may be between 0.25 and 0.75, also see FIG. 4.

In contrast to afocal zoom systems for adjusting the laser focus size, which are designed for collimated input beams and consist of at least three optical devices, at least two of which are moved, only two optical devices L1, L2 are required in the present case. Position and size of the focus F may be controlled by a movement of both optical devices L1, L2, which can be controlled independent of one another, as explained in FIGS. 2 and 3.

An objective O, hereinafter referred to as third optical device O, serves to focus the laser beam. The third optical device O may have a positive focal length fO. The third optical device O may be arranged downstream of the collimation optic K in the beam propagation direction R. It may focus the beams P leaving the collimation optic K in a collimated state to a focus F. In this respect, the focus F may be formed on or at a distance from a surface of the material M. The third optical device O may have a constant distance with respect to the beam supply Z. In other words, it is not necessary to move the third optical device O to adjust the size or the position of the focus F. Arrangements where the focusing objective O has to be shifted in order to vary the size and position of focus are unfavorable for scanning systems, given that the optical elements need to be large in the focusing due to the beam deflection and a highly dynamic adjustment thereof is correspondingly not possible.

At least one of the first optical device L1, the second optical device L2 and the third optical device O may consist of a single lens or of several lenses. Lenses are able to refract laser beams at their surfaces in a transmissive way. At least one of the first optical device L1, the second optical device L2 and the third optical device O may comprise one or more aspherical optical elements or reflective optical elements. Aspherical optical elements may comprise less optical aberrations compared to spherical optical elements, whereby the number of the required optical elements may be reduced and the power compatibility of the optical system may be increased. An exemplary embodiment of a collimation optic K having reflective optical elements is described in connection with FIG. 6.

The system 100 may comprise a beam deflecting unit AE for deflecting the beams P from the beam propagation direction R to a direction other than the beam propagation direction R. The beam deflecting unit AE may comprise at least one deflection axis, the deflection axes usually being arranged perpendicular to the beam propagation direction R (Z-direction) and perpendicular to one another (X-direction, Y-direction). Thereby, the laser beams may be deflected along a line or over a surface of the material M, for example along a contour to be processed. The beam deflecting device AE may, for example, comprise one or more, in particular two movably supported mirrors which are moved by a galvanometer drive (galvanometer scanner). Galvanometer scanners of this type may be highly dynamic, making high processing speeds possible.

The beam deflecting unit AE may be arranged in a beam propagation direction R between the second optical device L2 and the third optical device O. However, the beam deflecting unit AE may also be arranged in the beam propagation direction R downstream of the third optical device O. In addition, other components, such as beam splitters, beam forming elements, etc. may be included in the beam path.

The system 100 may comprise a first adjusting element A1 for moving the first optical device L1 along the beam propagation direction R and a second adjusting element A2 for moving the second optical device L2 along the beam propagation direction R. The first adjusting element A1 and the second adjusting element A2 may move the first optical device L1 and the second optical device L2 independent of each other. The first adjusting element A1 and the second adjusting element A2 may be linear drives, in particular direct drives. Gear backlash and inertial masses are reduced as a result of the omission of gearing mechanisms, enabling precise and fast movements of the first optical device L1 and the second optical device L2.

Figure 2:
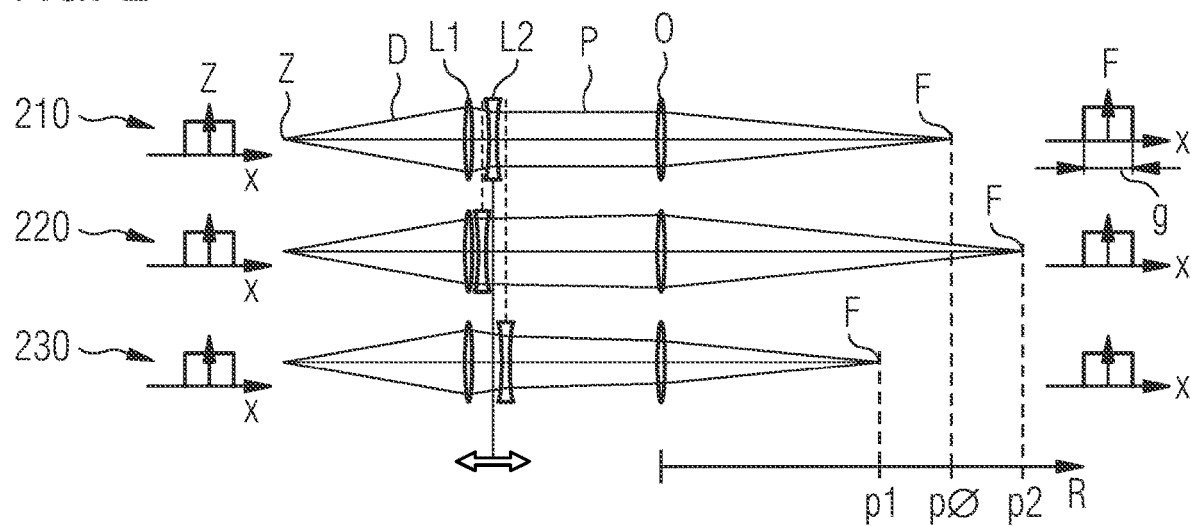
FIG. 2 shows exemplary configurations to illustrate focus position displacements.
Figure 3:
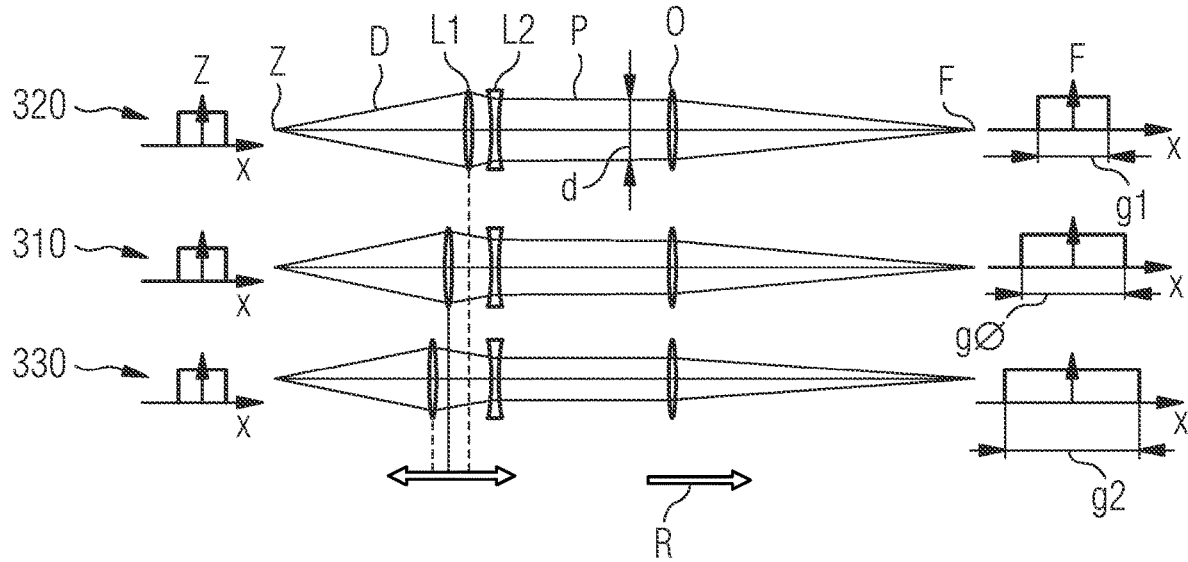
FIG. 3 shows exemplary configurations to illustrate changes in focus size.

Due to the fact that a size of the focus F may substantially be adjusted by moving the first optical device L1 and a position of the focus F along the beam propagation direction R may substantially be adjusted by moving the second optical device L2, as described in FIG. 2 and FIG. 3 together with the related parts of the description, the focus size and the focus position of the laser radiation may thus be adjusted precisely and with high dynamics.

The system 100 may comprise a controller S which is able to control the first adjusting element A1, the second adjusting element A2 and the beam deflecting unit AE. Thereby, the controller S is able to coordinate the movement of the first optical device L1, the second optical device L2 and the beam deflection in the beam deflecting unit AE in such a way that the size of the focus F, the position of the focus F along the beam propagation direction R (Z-direction) and the position of the focus along at least one direction deviating from the beam propagation direction R, for example perpendicular directions (X-direction, Y-direction) can be adjusted to corresponding predetermined values. The focus size g and the focus position (x, y, z) relative to a surface of a material M to be processed may thereby be adjusted to predetermined values independent of each other.

FIG. 2 illustrates by means of example arrangements 210, 220 and 230 how a position p of the focus F may be shifted in the beam propagation direction R. Arrangement 210 shows a mean focus position p0, arrangement 220 shows a distant focus position p2, and arrangement 230 shows a near focus position p1. The arrangements 210, 220, 230 may comprise a beam supply Z, a first optical device L1, a second optical device L2, and a third optical device O. For example, the position p of the focus F may be measured originating from the third optical device O. On the left-hand side of FIG. 3, the sizes/diameters of the laser beams at the beam supply Z in the arrangements 210, 220 and 230 are indicated along a direction, for example the X-direction. The sizes of the laser beams at the beam supply Z are substantially constant. On the right-hand side of FIG. 3, the sizes g of the focus F are indicated along a direction, for example the X-direction. The size g of the focus F is substantially constant, if the beam path between the second optical device L2 and the third optical device O is selected accordingly (see the explanations below as to Equation 5). The arrangements 210, 220 and 230 may correspond to the system for laser material processing 100 of FIG. 1; in this respect, the controller S, the first adjusting element A1, the second adjusting element A2 and the beam deflecting unit AE have been omitted for reasons of clarity.

In order to displace the position p of the focus F in the beam propagation direction R, the second optical device L2 may be displaced along the beam propagation direction R. The displacement or movement of the second optical device L2 is marked by a double arrow. The first optical device L1 is usually not moved to change the position p of the focus F.

In the arrangement 210, the focus F has the position p0. The collimated beams P leaving the second optical device L2 are substantially parallel, i.e., they have a divergence close to zero.

In the arrangement 220, the second optical device L2 was displaced towards the first optical device L1 with respect to the arrangement 210. The collimated beams P have a slight divergence with respect to the collimated beams P of the arrangement 210. As a result thereof, the focus F shifts to a position p2 which is further away from the third optical device O than the position p0 in the arrangement 210.

In the arrangement 230, the second optical device L2 was displaced away from the first optical device L1 with respect to the arrangement 210. The collimated beams P have a slight convergence with respect to the collimated beams P of the arrangement 210. As a result thereof, the focus F shifts to a position p1 which is closer to the third optical device O than the position p0 in the arrangement 210.

Depending on the optical path between the collimation optic K and the third optical device O, the focus size g may change when the second optical device L2 is displaced. In order to correct this change in focus size, a small compensation movement of the first optical device L1 may be made.

FIG. 3 illustrates by means of exemplary arrangements 310, 320 and 330 how a size g of the focus F may be changed. In this respect, the arrangements 310, 320, and 330 may correspond to the arrangements 210, 220, and 230 of FIG. 2 and shall not described again. On the right-hand side of FIG. 3, the sizes g0, g1, and g2 of the focus F are indicated along a direction, for example the X-direction. The arrangement 310 shows a mean focus size g0, the arrangement 320 shows a small focus size g1, and the arrangement 330 shows a large focus size g2.

In order to change the size g of the focus F, the first optical device L1 is displaced along the beam propagation direction R. The displacement or movement of the first optical device L1 is marked by a double arrow. The second optical device L2 is usually not moved for changing the size g of the focus F. The collimated beams P leaving the second optical device L2 are substantially parallel, i.e., they have a divergence of close to zero. A displacement of the first optical device L1 substantially results in a change in the image ratio and thus in a change in the focus size g.

In the arrangement 310, the focus F has the mean focus size g0.

In the arrangement 320, the first optical device L1 was displaced with respect to the arrangement 210 toward the second optical device L2. The collimated beams P are larger in diameter d compared to the collimated beams P of the arrangement 310. As a result thereof, the focus F may have a smaller size g1 than the size g0 of the focus F in the arrangement 310.

In the arrangement 330, the first optical device L1 was displaced away from the second optical device L2 compared to the arrangement 310. Compared to the collimated beams P of the arrangement 310, the collimated beams P are smaller in diameter d. As a result thereof, the focus F may have a larger size g2 than the size g0 of the focus F in the arrangement 310.

When the first optical device L1 is displaced, the position p of the focus F may slightly change. In order to compensate for this change in the focus position, a small compensation movement of the second optical device L2 may be made.

Figure 4:
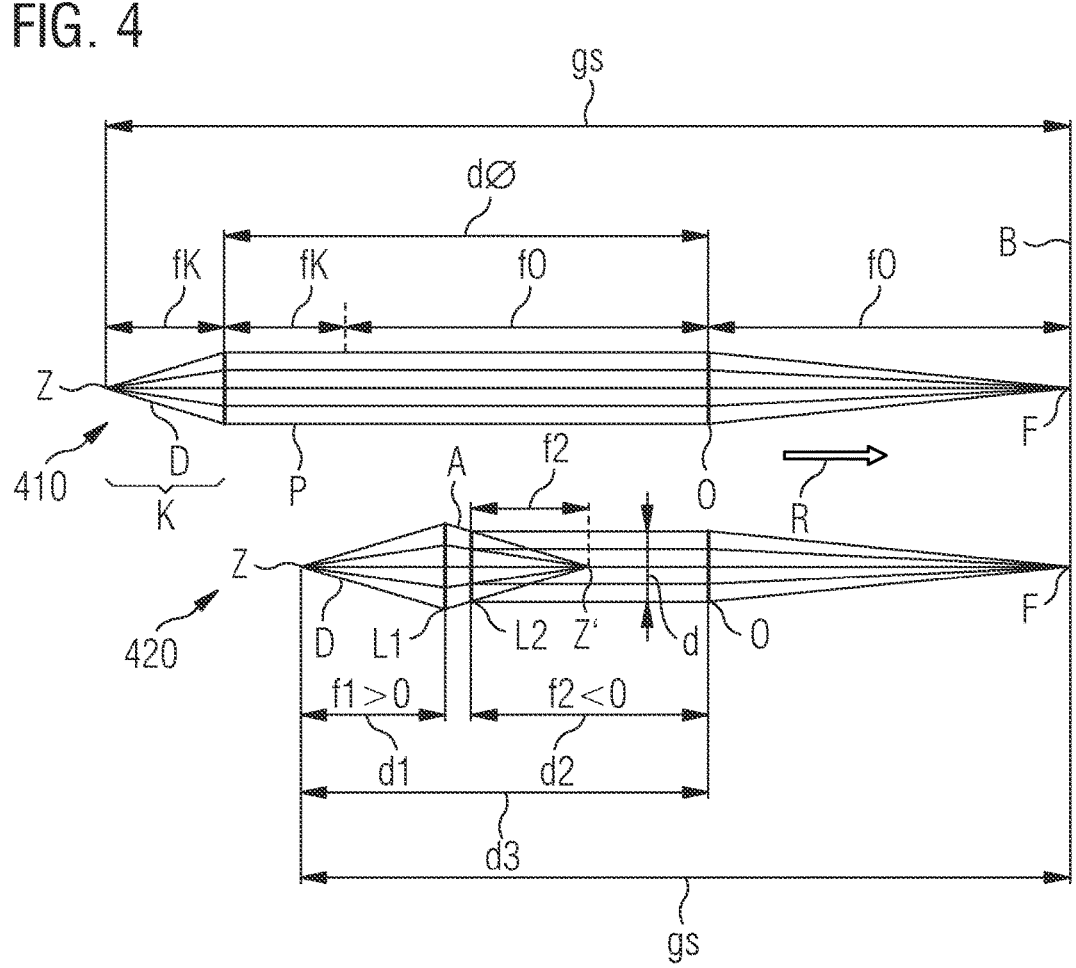
FIG. 4 shows dimensions of laser material processing systems.

In FIG. 4, a known device 410 is compared to an exemplary device 420 according to the invention. In particular, the dimensioning of the examined systems for laser material processing is illustrated.

The arrangement 410 may comprise any collimation optic K which reshapes divergent beams D from the beam supply Z into collimated beams P. For simplification, the collimation optic K is drawn as a line. The essential feature of the arrangement 410 is that the optical elements included in the collimation optic K may be moved altogether relative to the beam supply Z, in order to achieve a displacement of the position p of the focus F in the beam propagation direction R. For this purpose, the collimation optic K may be connected to an actuator and a controller which are not considered in the Figure.

By choosing an appropriate mean distance d0 between the collimation optic K and the third optical device O, it is possible to achieve a focus size g which is constant independent of the focus displacement along the beam propagation direction R. In the paraxial approximation, this is the case if and only if the distance d0 between the collimation optic K and the third optical device O equals the sum of the focal length fK of the collimation optic K (collimation focal length) and the focal length fO of the third optical device O:

$$d0 = fK + fO \text{(paraxial)} \qquad \text{Equation 1:}$$

Equation 1 is tantamount to the paraxial condition, according to which the collimation optic K and the third optical device O form a telescope-like optical arrangement. In an arrangement of the collimation optic K and the third optical device O for imaging a fiber end to a workpiece, the total beam path gs between the beam supply Z and an image-side focal plane B of the third optical device O then is, in a paraxial approximation, twice the sum of the total collimation focal length fK and the positive focal length fO of the third optical device O:

$$gs = 2*(fK + fO) \text{(paraxial)} \qquad \text{Equation 2:}$$

Using a collimation optic K as shown and described in FIG. 1 to FIG. 3, the total beam path gs of a laser material processing system may, however, be significantly shorter, see the arrangement 420. For simplification of the illustration, the first optical device L1 and the second optical device L2 are shown as lines in the arrangement 420. The first optical device L1 may be regarded as imaging optic for the light bundle D leaving the beam supply Z. The second optical device L2 may be considered as virtual collimation for the light bundle converging to the image of the beam supply Z'. To achieve a displacement of the position p of the focus F in the beam propagation direction R, a movement of the second optical device L2 is sufficient in the arrangement 420; it is not necessary to move the collimation optic K as a whole, as it is the case in the arrangement 410.

By choosing an appropriate mean distance between the collimation optic K and the third optical device O, it is, also in the arrangement 420, possible to achieve a focus size g which is constant independent of the focus displacement along the beam propagation direction R, as already illustrated above as to the arrangement 410. Due to the fact that not the entire collimation optic K but only the second optical device L2 is moved in the arrangement 420 to displace the focus, Equation 1 changes as follows for the arrangement 420:

$$d2 = f2 + fO \text{(paraxial)} \qquad \text{Equation 3:}$$

Equation 3 is tantamount to the paraxial condition, according to which the second optical device L2 and the third optical device O form a telescope-like optical arrangement. In the arrangement 420, the second optical device L2 takes the role of the total collimation in the arrangement 410 with respect to the distance between the collimation optic K and the third optical device O.

The reason for the total beam path which is significantly shorter in the arrangement 420 than it is in the arrangement 410, is the negative focal length f2 of the second optical device L2 in the collimation optic K. Due to the minus sign of the focal length f2, the distance d2 between the collimation optic K and the third optical device O is significantly shorter than fO in the arrangement 420 according to Equation 3, while it is significantly greater than fO in the arrangement 410 according to Equation 1. Accordingly, the total beam path gs is significantly reduced in the arrangement 420 compared to the arrangement 410. The total beam path gs between the beam supply Z and an image-side focal plane B of the third optical device O may therefore be smaller than twice the sum of the positive focal length fO of the third optical device O and the total collimation focal length fK.

This may not only apply paraxially, but, based on the great reduction in the total beam path that can be achieved in 420, also if real, non-paraxial optical devices are considered:

$$gs < 2*(fK + fO) \qquad \text{Equation 4:}$$

In a first embodiment of the laser material processing system, the first optical device L1 may be fixed (or immobile) in the beam propagation direction R. In other words, the first optical device L1 requires no first adjusting element A1. The controller S only needs to control the second adjusting element A2 and the beam deflecting unit AE, so that a position (x, y, z) of the focus F, for example with respect to the surface of the material M to be processed, may be adjusted to predetermined values.

When the second optical device L2 is moved by means of the second adjusting element A2, the size g of the focus F may be kept substantially constant by careful selection of the mean beam path d2 between the collimation optic K and the third optical device O, as it is described above. This is the case if the second optical device L2 and the third optical device O are arranged in a way to substantially form a telescope-like optical arrangement.

In real, non-paraxial optical devices, d2 is to be understood as the beam path between an image-side principal plane of the second optical device L2 and an object-side principal plane of the third optical device O.

Therefore, a constant focus size independent of the focus displacement arises, for example, if the mean beam path d2 between the image-side principal plane of the second optical device L2 and the object-side principal plane of the third optical device O is approximately equal to the sum of the negative focal length f2 of the second optical device L2 and the positive focal length fO of the third optical device O:

$$d2 \approx f2 + fO \qquad \text{Equation 5:}$$

For the mean beam path d2, a corresponding area may also be indicated, which covers the typical requirements with respect to the constancy of the focus size for a system for laser material processing:

$$f2 + 0.75*fO < d2 < f2 + 1.25*fO \qquad \text{Equation 6:}$$

In a second embodiment of the laser material processing system, the first optical device L1 and the second optical device L2 may be movable in the beam propagation direction R. The controller S may control the first adjusting element A1 and the second adjusting element A2 in a coordinated way. A change in the position p of the focus F along the beam propagation direction R due to the movement of the first optical device L1 may be considered by the controller S in this respect, in order to adjust the predetermined position p. A change in the size g of the focus F due to the movement of the second optical device L2 along the beam propagation direction R may be considered by the controller S as well, in order to adjust the predetermined size g. Hence, the desired position p and size g of the focus can be adjusted independent of each other.

The change in the position p and/or the change in the size g of the focus F may, for example, be considered as follows: the controller S may access reference control data which reflect the position p and the size g of the focus F depending on the positions of the first optical device L1 and the second optical device L2 along the beam propagation direction R. The reference control data may be determined by a calculation, for example by an optical simulation of the laser material processing system or by a measurement, for example prior to or during the operation of the laser material processing system, from the position p and the size g of the focus F. The reference control data may, for example, be stored in a control curve or a table. Using the reference control data, the required positions of the first optical device L1 and the second optical device L2 along the beam propagation direction R may be determined, in order to adjust the desired or predetermined values for the position p and the size g of the focus F. As the case may be, the calculation, the simulation or the measurements or the reference control data may be adjusted to the operating conditions or corrected by means of measurement data (calibration).

The mean beam path d2 between the image-side principal plane of the second optical device L2 and the object-side principal plane of the third optical device O may be chosen also in the second embodiment in such a way that the size g of the focus F is substantially constant when the second optical device L2 is moved by means of the second adjusting element A2, by for example arranging the second optical device L2 and the third optical device O in a way to form a telescope-like optical arrangement. However, this requirement is not binding, given that a change in the size g of the focus F when the second optical device L2 is moved may be compensated for by the movement of the first optical device L1. Therefore, the system for laser material processing may be designed to be even more compact in the second embodiment than in the first embodiment:

$$d2 < f2 + 0.75*fO \qquad \text{Equation 7:}$$

In the second embodiment, the controller S may control the first optical device L1, the second optical device L2 and the beam deflecting unit AE in such a way that a position (x, y, z) of the focus F, for example with respect to the surface of the material M to be processed, and a size g of the focus F may be adjusted to predetermined values.

Table 1 shows various values and ranges for the sinus of the half-angle divergence hw of the divergent beams D, the collimation focal length fK, the diameter d of the beams P after passing through the collimation optic K, the positive focal length f1 of the first optical device L1, the negative focal length f2 of the second optical device L2, and the positive focal length fO of the third optical group O.

TABLE 1

| | Meaning | Range 1 | Range 2 |
|---|---|---|---|
| hw | sinus of the half-angle divergence of the divergent beams D | 0.05 . . . 0.15 | 0.03 . . . 0.26 |
| fK [mm] | collimation focal length | 60 . . . 300 | 40 . . . 500 |
| d [mm] | diameter of the beams P after passing through the collimation optic K | 14 . . . 50 | 10 . . . 70 |
| f1 [mm] | positive focal length of the first optical device L1 | 55 . . . 120 | 40 . . . 250 |
| f2 [mm] | negative focal length of the second optical device L2 | −75 . . . −160 | −55 . . . −360 |
| fO [mm] | positive focal length of the third optical group O | 300 . . . 800 | 150 . . . 2000 |

Figure 5:
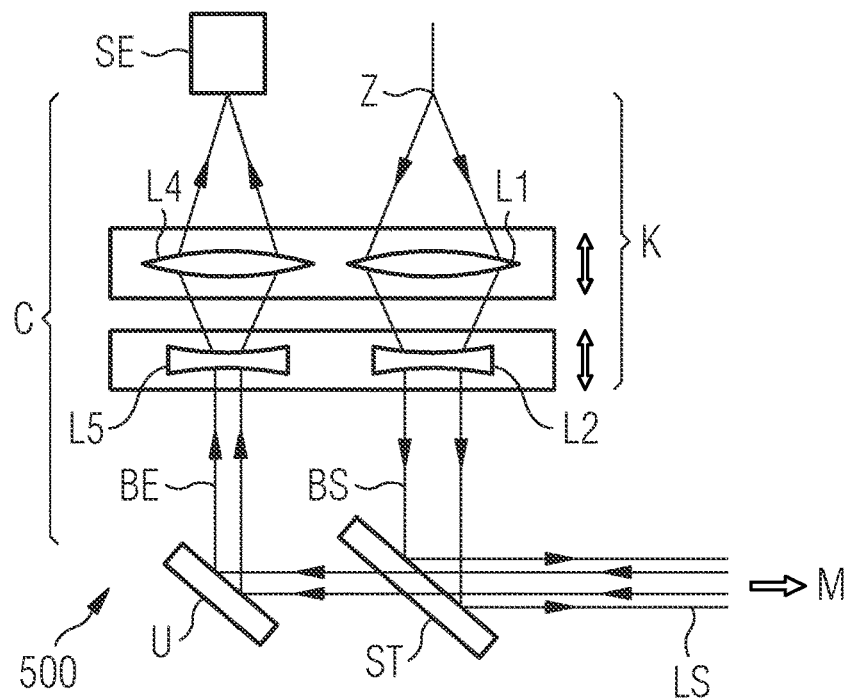
FIG. 5 shows a collimation optic having an observation optic.

FIG. 5 shows an arrangement 500 in which an observation optic C may be arranged optically parallel to the collimation optic K. The observation optic C may comprise a fourth optical device L4 and a fifth optical device L5, through which an observation beam BE may pass. The observation beam BE may be seen directly with a user's eyes or may be detected by a sensor or a camera SE. The collimation optic K may be any one of the above-described collimation optics K, for example from the arrangement 420, having a beam supply Z, a first optical device L1 and a second optical device L2. A processing beam BS may pass through the collimation optic K, which processing beam may consist of laser beams which are suited for processing material.

The arrangement 500 may comprise a beam splitter ST and a deflecting mirror U. The beam splitter ST may reflect the observation beam BS from the collimation optic K in the direction of the material M. Light beams LS from the direction of the material M may penetrate the beam splitter ST and may hit the deflecting mirror U. The deflecting mirror U may reflect the light beams as an observation beam BE in the direction of the observation optic C. Thereby, the observation optic C may serve to observe or detect the size and the position of the focus of the processing beam BS together with the deflecting mirror U and the beam splitter ST. In addition, the material M or workpiece processed using the processing beams PS may thus be viewed, for example in order to detect the size, shape or position of the workpiece M or a processing progress.

The fourth optical device L4 may comprise a positive focal length f4 which corresponds approximately to the positive focal length f1 of the first optical device L1. The fifth optical device L5 may comprise a negative focal length f5 which corresponds approximately to the negative focal length f2 of the second optical device L2. Thereby, the observation beam BE and the processing beam BS may be focused to the same location, for example on the material M or workpiece. In other words, the observation beam BE and the processing beam BS may comprise the same focus.

In the first embodiment, the first optical device L1 may be fixed, i.e., it does not move in the direction of the processing beam BS. The fourth optical device L4 may be coupled to the first optical device L1 and may be fixed in the same way. In the first embodiment, the second optical device L2 may be moved. A movement of the fifth optical device L5 may be coupled to the movement of the second optical device L2. In other words, the second optical device L2 and the fifth optical device L5 may move together. A change in the optical properties of the collimation optic K by moving the second optical device L2 may thus be transferred to the observation optic C, so that the focus thereof changes correspondingly. The observation beam BE and the processing beam BS may thus keep the same focus—even if the second optical device L2 is moved. The coupling may be effected by a rigid mechanical connection between the second optical device L2 and the fifth optical device L5.

In the second embodiment, both the first optical device L1 and the second optical device L2 may be moved. The movement of the fourth optical device L4 may be coupled to the movement of the first optical device L1, and the movement of the fifth optical device L5 may be coupled to the movement of the second optical device L2. In other words, the first optical device L1 and the fourth optical device L4 may move together and the second optical device L2 and the fifth optical device L5 may also move together. A change in the optical properties of the collimation optic K by movement of the first optical device L1 and, as the case may be, the second optical device L2, may thus be transferred to the observation optic C, so that the focus thereof changes correspondingly. The observation beam BE and the processing beam BS may thus keep the same focus when the focus position and the focus size are adjusted. The coupling may respectively be effected by a rigid mechanical connection of the first optical device L1 with the fourth optical device L4 and the second optical device L2 and the fifth optical device L5, respectively.

The movement of the coupled first optical device L1 and the fourth optical device L4 may, for example, be effected by means of the first adjusting element A1. The movement of the coupled second optical device L2 and the fifth optical device L5 may, for example, be effected by the second adjusting element A2. The directions of movement are marked by double arrows.

Figure 6:
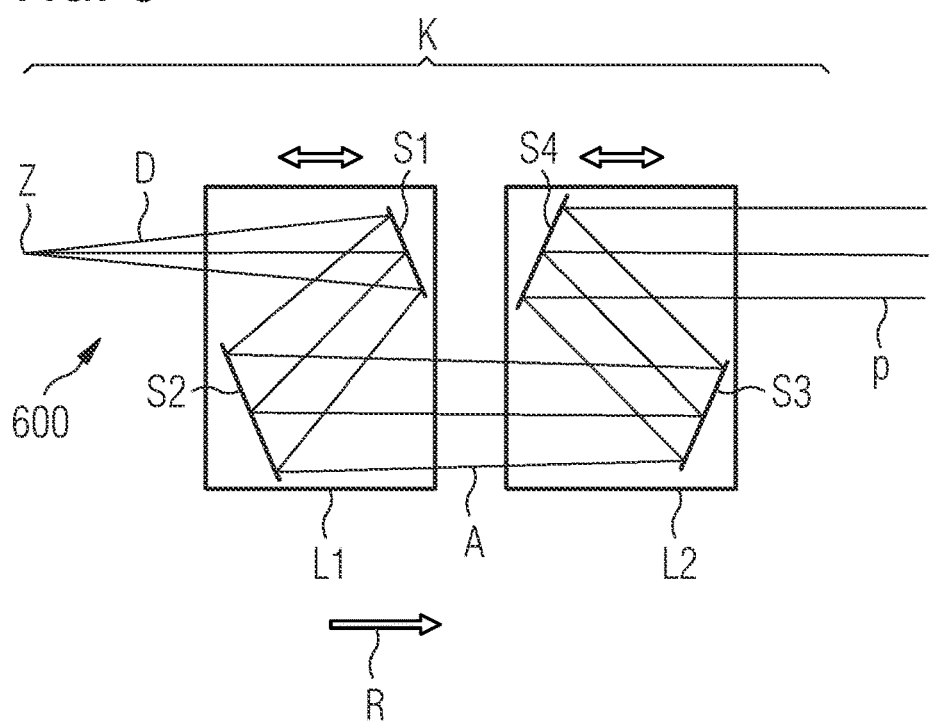
FIG. 6 shows a collimation optic having reflective optical elements.

FIG. 6 shows an embodiment 600 of a collimation optic K having a beam supply Z, a first optical device L1 and a second optical device L2. The first optical device L1 and the second optical device L2 may comprise reflective optical elements S1, S2, S3 and S4. Compared to transmissive optical elements, reflective optical elements have the advantage that they can be cooled more easily. This increases the power compatibility of the optical system, so that it is compatible with high laser powers. The reflective optical elements S1, S2, S3, S4 may be mirrors, such as plane mirrors, convex mirrors or concave mirrors. The mirrors may be metal mirrors, dichroitic dielectric mirrors (interference mirrors) or prism mirrors.

The beam supply Z may provide divergent beams D which may be incident on the first optical device L1 and may leave it as emergent beams A. The emergent beams A may hit the second optical device L2 and may leave it as collimated beams P.

The first optical device L1 may be a converging device, i.e., it may comprise a positive focal length. In other words, the emergent beams A may have a lower divergence than the incident beams D. The first optical device L1 may comprise a first mirror S1 and a second mirror S2. The first mirror S1 may be a plane mirror and the second mirror S2 may be a concave mirror or vice versa. The first optical device L1 may be moved along a beam propagation direction R, as suggested by the double arrow, for example by the first adjusting element A1.

The second optical device L2 may be a diverging device, i.e, it may comprise a negative focal length. In other words, the emergent beams P may have a greater divergence than the incident beams A. The second optical device L2 may comprise a third mirror S3 and a fourth mirror S4. The third mirror S3 may be a plane mirror and the fourth mirror S4 may be a convex mirror or vice versa. The second optical device L2 may be moved along a beam propagation direction R, as suggested by the double arrow, for example by the second adjusting element A2.

The collimation optic K having reflective optical elements shown in FIG. 6 may be used in the embodiments described in FIG. 1 to FIG. 5. In this respect, the third optical device L3 may be a converging device having a positive focal length, similar to the first optical device L1, which is, for example, also generated by reflective optical elements.

The devices described in FIG. 1 to FIG. 6 may serve to carry out a method. The method serves to adjust a size g and a position p of a focus F along a beam propagation direction R of a laser beam for laser material processing. In the method, substantially collimated beams P may be generated having a total collimation focal length fK.

For this purpose, divergent beams D may be provided, which are supplied to a first optical device L1 having a positive focal length f1. Beams A which have passed through the first optical device L1 having a positive focal length f1 may be supplied to a second optical device L2 having a negative focal length f2. The divergent beams D, the first optical device L1 and the second optical device L2 may be configured and arranged in such a way that the beams P which have passed through the second optical device L2 are substantially collimated. Thereby, it is possible to produce a collimation optic K with only the two optical devices L1, L2. The focus F may be produced by supplying the substantially collimated beams P to a third optical device O. The third optical device O and a supply Z for the divergent beams D may be arranged at a fixed distance d3 to each other. In other words, the third optical device O does not need to be moved for adjusting the focus size and the focus position, whereby an adjusting element and the control thereof are not required for the third optical device O.

The total beam path gs between a beam supply Z for the divergent beams D and an image-side focal plane B of the third optical device O may be chosen to be smaller than twice the sum of the positive focal length fO of the third optical device O and the total collimation focal length fK, so that a very compact system for laser material processing is generated.

The first optical device L1 and the second optical device L2 may be moved in such a way that the size g of the focus F and the position p of the focus F may be adjusted along the beam propagation direction R to predetermined values, selectable independent of each other.

The size g of the focus F may be adjusted substantially by moving the first optical device L1 along the beam propagation direction R. The position p of the focus F along the beam propagation direction R may substantially be adjusted by moving the second optical device L2 along the beam propagation direction R.

A change in the position p of the focus F along the beam propagation direction R due to the movement of the first optical device L1 may be considered when adjusting the predetermined values. A change in the size g of the focus F due to the movement of the second optical device L2 may be considered as well when the predetermined values are set. The consideration may, for example, take place by means of a preceding simulation or a measurement of the respective change and the determination of corresponding correction values. It is possible to adjust the desired values directly by means of the correction values.

The beams P from the propagation direction R may be deflected to a direction other than the beam propagation direction R, for example by a beam deflecting unit AE, for example a galvanometer scanner. The movement of the first optical device L1, the movement of the second optical device L2 and the deflection of the beams may be carried out in a coordinated way and simultaneously, in order to adjust the size g of the focus F and the position of the focus F with respect to a surface of a material M to be processed to predetermined values. Thereby, a highly dynamic laser material processing may be realized.

LIST OF REFERENCE SIGNS 100 system for laser material processing
210 arrangement with mean focus position
220 arrangement with distant focus position
230 arrangement with near focus position
310 arrangement with mean focus size
320 arrangement with small focus size
330 arrangement with large focus size
410 known laser material processing system
420 laser material processing system
500 laser material processing system with observation optic
600 collimation optic with reflective elements
A emergent beams
A1 other adjusting element/first adjusting element
A2 adjusting element/second adjusting element
AE beam deflecting unit
B image-side focal plane of the third optical device
BE observation beam
BS processing beam
C observation optic
D divergent beams/incident beams
F focus
K collimation optic
L laser source
L1 first optical device
L2 second optical device
L4 fourth optical device
L5 fifth optical device
LS light beams
M material
O third optical device
P collimated beams
R beam propagation direction
S controller
S1 first mirror
S2 second mirror
S3 third mirror
S4 fourth mirror
SE sensor/camera
ST beam splitter
U deflecting mirror
Z beam supply/supply
Z' virtual image of beam supply
d0 mean distance between collimation optic and third optical device
d diameter of the collimated beams
d1 distance between beam supply and object-side principal plane of the first optical device
d2 mean distance between image-side principal plane of the second optical device and object-side principal plane of the third optical device
d3 distance between beam supply and third optical device
f1 focal length of the first optical device
f2 focal length of the second optical device
f4 focal length of the fourth optical device
f5 focal length of the fifth optical device
fk total collimation focal length
fO focal length of the third optical device
g, g1, g2 size of the focus
gs total beam path
hw half-divergence angle
p, p1, p2 position of the focus along the beam propagation direction

The invention claimed is:

1. A system for laser material processing, comprising:
a collimation optic (K) having a total collimation focal length (fK), consisting of:
a beam supply (Z) for divergent beams (D);
a first optical device (L1) having a positive focal length (f1), and
a second optical device (L2) having a negative focal length (f2),
wherein the divergent beams (D) first pass through the first optical device (L1) and subsequently pass through the second optical device (L2), and leave the second optical device (L2) in a collimated state;
a third optical device (O) having a positive focal length (fO), wherein the third optical device (O) is arranged downstream of the collimation optic (K) and focuses the beams (P) leaving the collimation optic (K) in a collimated state to a focus (F); and
an adjusting element (A2) configured to move the second optical device (L2) along a beam propagation direction (R); and
wherein an arrangement of the second optical device (L2) and the third optical device (O) defines a mean beam path (d2) between an image-side principal plane of the second optical device (L2) and an object-side principal plane of the third optical device (O),
wherein the mean beam path (d2) fulfils the following condition:

$$f2+0.75*fO<d2<f2+1.25*fO$$

so that a size (g) of the focus (F) is substantially constant when moving the second optical device (L2) by means of the adjusting element (A2), and
wherein a total beam path (gs) between the beam supply (Z) and an image-side focal plane (B) of the third optical device (O) is smaller than twice the sum of the positive focal length (fO) of the third optical device (O) and the total collimation focal length (fK).

2. The system according to claim 1, wherein the first optical device (L1) is fixed in the beam propagation direction (R).

3. The system according to claim 1, wherein the beam supply (Z) is coupled to an end of an optical fiber from which diverging laser radiation emerges.

4. The system according to claim 1, wherein a ratio of the positive focal length (f1) of the first optical device (L1) to a distance (d1) between the beam supply (Z) and an object-side principal plane of the first optical device (L1) is between 0.25 and 0.75.

5. The system according to claim 1, wherein the first optical device (L1) is arranged in a way that an angle of incident beams (D) is equal to an angle of emergent beams (A).

6. The system according to claim 1, wherein
a sinus of a half-angle divergence (hw) of the divergent beams (D) is in the range of 0.05 to 0.15,
the positive focal length (f1) of the first optical device (L1) is in the range of 55 mm to 120 mm,
the negative focal length (f2) of the second optical device (L2) is in the range of −75 mm to −160 mm,
the total collimation focal length (fK) is in the range of 60 mm to 300 mm,
a diameter (d) of the beams (P) is in the range of 14 mm to 50 mm after passing through the collimation optic (K), and
the positive focal length (fO) of the third optical group (O) is in the range of 300 mm to 800 mm.

7. The system according to claim 1, wherein the third optical device (O) has a constant distance with respect to the beam supply (Z).

8. The system according to claim 1, wherein the another adjusting element (A1) and the adjusting element (A2) are linear drives.

9. The system according to claim 1, further comprising:
a beam deflecting unit (AE) for deflecting the beams (P) from the beam propagation direction (R) to another direction, and
a controller (S) for controlling the adjusting element (A2) and the beam deflecting unit (AE), so that a position of the focus (F) with respect to a surface of a material (M) to be processed is adjustable to predetermined values.

10. The system according to claim 9, wherein the beam deflecting unit (AE) is arranged downstream of the third optical device (O) in the beam propagation direction (R), or the beam deflecting unit (AE) is arranged in the beam propagation direction (R) between the second optical device (L2) and the third optical device (O).

11. The system according to claim 1, further comprising:
a fourth optical device (L4) having a positive focal length (f4) which corresponds to the positive focal length (f1) of the first optical device (L1), and
a fifth optical device (L5) having a negative focal length (f5) which corresponds to the negative focal length (f2) of the second optical device (L2),
wherein
the first optical device (L1) and the second optical device (L2) are configured to be passed-through by a processing beam (BS),
the fourth optical device (L4) and the fifth optical device (L5) are configured to be passed-through by an observation beam (BE),
the fourth optical device (L4) is coupled to the first optical device (L1), and
a movement of the fifth optical device (L5) is coupled to a movement of the second optical device (L2).

12. The system according to claim 11, wherein the third optical device (O) has a constant distance with respect to the beam supply (Z).

13. A system for laser material processing, comprising:
a collimation optic (K) having a total collimation focal length (fK), consisting of:
a beam supply (Z) for divergent beams (D);
a first optical device (L1) having a positive focal length (f1), and
a second optical device (L2) having a negative focal length (f2),
wherein the divergent beams (D) first pass through the first optical device (L1) and subsequently pass through the second optical device (L2), and leave the second optical device (L2) in a collimated state;
a third optical device (O) having a positive focal length (fO), wherein the third optical device (O) is arranged downstream of the collimation optic (K) and focuses the beams (P) leaving the collimation optic (K) in a collimated state to a focus (F);
an adjusting element (A2) configured to move the second optical device (L2) along a beam propagation direction (R),
another adjusting element (A1) for moving the first optical device (L1) along the beam propagation direction (R), and
wherein said another adjusting element (A1) and the adjusting element (A2) are able to move the first optical device (L1) and the second optical device (L2) independent of each other, wherein a total beam path (gs) between the beam supply (Z) and an image-side focal plane (B) of the third optical device (O) is smaller than twice the sum of the positive focal length (fO) of the third optical device (O) and the total collimation focal length (fK).

14. The system according to claim 6, wherein a mean beam path (d2) defined as between an image-side principal plane of the second optical device (L2) and the object-side principal plane of the third optical device (O) and fulfils the following condition:

$$f2+0.75*fO<d2<f2+1.25*fO$$

so that a size (g) of the focus (F) is substantially constant when moving the second optical device (L2) by means of the adjusting element (A2).

15. The system according to claim 6, further comprising:
a fourth optical device (L4) having a positive focal length (f4) which corresponds to the positive focal length (f1) of the first optical device (L1), and
a fifth optical device (L5) having a negative focal length (f5) which corresponds to the negative focal length (f2) of the second optical device (L2); and
wherein the first optical device (L1) and the second optical device (L2) are configured to be passed-through by a processing beam (BS),
the fourth optical device (L4) and the fifth optical device (L5) are configured to be passed-through by an observation beam (BE),
a movement of the fourth optical device (L4) is coupled to a movement of the first optical device (L1), and
a movement of the fifth optical device (L5) is coupled to a movement of the second optical device (L2).

16. The system according to claim 13, wherein the beam supply (Z) is coupled to an end of an optical fiber from which diverging laser radiation emerges.

17. The system according to claim 13, wherein a ratio of the positive focal length (f1) of the first optical device (L1) to a distance (d1) between the beam supply (Z) and an object-side principal plane of the first optical device (L1) is between 0.25 and 0.75.

18. The system according to claim 13, wherein the first optical device (L1) is arranged in a way that an angle of incident beams (D) is equal to an angle of emergent beams (A).

19. The system according to claim 13, wherein
a sinus of a half-angle divergence (hw) of the divergent beams (D) is in the range of 0.05 to 0.15,
the positive focal length (f1) of the first optical device (L1) is in the range of 55 mm to 120 mm, the negative focal length (f2) of the second optical device (L2) is in the range of −75 mm to −160 mm,
the total collimation focal length (fK) is in the range of 60 mm to 300 mm,
a diameter (d) of the beams (P) is in the range of 14 mm to 50 mm after passing through the collimation optic (K), and
the positive focal length (fO) of the third optical group (O) is in the range of 300 mm to 800 mm.

20. The system according to claim 6, further comprising:
a controller (S) configured to control said another adjusting element (A1) and the adjusting element (A2) to respectively move the first optical device (L1) and the second optical device (L2) so as to adjust a size (g) of the focus (F) and a position (p) of the focus (F) along the beam propagation direction (R) to predetermined values, wherein the predetermined values are independently selectable from each other,
wherein:
the size (g) of the focus (F) is adjustable by moving the first optical device (L1),
the position (p) of the focus (F) along the beam propagation direction (R) is adjustable by moving the second optical device (L2), and
wherein the controller is configured to adjust the predetermined values based on:
a change in the position (p) of the focus (F) along the beam propagation direction (R) due to the movement of the first optical device (L1), and/or
a change in the size (g) of the focus (F) due to the movement of the second optical device (L2).

21. The system according to claim 8, wherein
the controller is further configured to change the position (p) and the size (g) of the focus (F) by being configured to:
store reference control data based on a calculation or measurement of the position (p) and the size (g) of the focus (F) depending on the positions of the first optical device (L1) and the second optical device (L2) along the beam propagation direction (R), and
determine necessary positions of the first optical device (L1) and the second optical device (L2) along the beam propagation direction (R) by means of the stored reference control data, in order to adjust the predetermined values for the position (p) and the size (g) of the focus (F).

22. The system according to claim 13, further comprising:
a beam deflecting unit (AE) for deflecting the beams (P) from the beam propagation direction (R) to another direction, and
wherein the controller (S) is configured to control said another adjusting element (A1), the adjusting element (A2) and the beam deflecting unit (AE), so that the size (g) of the focus (F) and a position (p) of the focus (F) with respect to a surface of a material (M) to be processed can be adjusted to predetermined values.

23. The system according to claim 22, wherein the another adjusting element (A1) and the adjusting element (A2) are linear drives.

24. System according to claim 22, wherein
the beam deflecting unit (AE) is arranged downstream of the third optical device (O) in the beam propagation direction (R), or
the beam deflecting unit (AE) is arranged in the beam propagation direction (R) between the second optical device (L2) and the third optical device (O).

25. A method for adjusting a size (g) and a position (p) of a focus (F) along a beam propagation direction (R) of a laser beam for laser material processing, comprising:
generating substantially collimated beams (P) having a total collimation focal length (fK) by:
providing divergent beams (D), and
supplying the divergent beams (D) to a first optical device (L1) having a positive focal length (f1);
supplying beams (A) which have passed through the first optical device (L1) having a positive focal length (f1) to a second optical device (L2) having a negative focal length (f2), wherein the divergent beams (D), the first optical device (L1) and the second optical device (L2) are configured and arranged in a way that the beams (P) having passed through the second optical device (L2) are substantially collimated;
generating the focus (F) by supplying the substantially collimated beams (P) to a third optical device (O), wherein a total beam path (gs) between a beam supply (Z) of the divergent beams (D) and an image-side focal plane (B) of the third optical device (O) is smaller than twice the sum of the positive focal length (fO) of the third optical device (O) and the total collimation focal length (fK);
adjusting the size (g) of the focus (F) to a predetermined value by moving the first optical device (L1) along the beam propagation direction (R);
adjusting the position (p) of the focus (F) along the beam propagation direction (R) to a predetermined value by moving the second optical device (L2) along the beam propagation direction (R); and
causing an adjustment of the predetermined values based on:
a change in the position (p) of the focus (F) along the beam propagation direction (R) due to the movement of the first optical device (L1), and
a change in the size (g) of the focus (F) due to the movement of the second optical device (L2), and
wherein the predetermined values are selectable and independent of each other.

26. The method according to claim 25, further comprising:
deflecting the beams (P) from the beam propagation direction (R) to a direction other than the beam propagation direction (R), wherein the movement of the first optical device (L1), the movement of the second optical device (L2) and the deflection of the beams are carried out in a coordinated way and simultaneously, in order to adjust the size (g) of the focus (F) and the position of the focus (F) with respect to a surface of a material (M) to be processed to predetermined values.

27. The method according to 25, wherein the third optical device (O) and a beam supply (Z) for the divergent beams (D) are arranged at a fixed distance (d3) relative to each other.

* * * * *